United States Patent
Uhm et al.

(10) Patent No.: US 10,205,137 B2
(45) Date of Patent: Feb. 12, 2019

(54) SECONDARY BATTERY TO WHICH ELECTROLYTE CAN BE ADDITIONALLY SUPPLIED

(71) Applicant: LG Chem, Ltd., Seoul (KR)

(72) Inventors: In Sung Uhm, Daejeon (KR); Ji Yoon Kwon, Daejeon (KR); Jung Woo Yoo, Daejeon (KR); Je Young Kim, Daejeon (KR); Hoe Jin Hah, Daejeon (KR); Kyoung Ho Kim, Daejeon (KR); Il Hong Kim, Daejeon (KR)

(73) Assignee: LG Chem, Ltd. (KR)

( * ) Notice: Subject to any disclaimer, the term of this patent is extended or adjusted under 35 U.S.C. 154(b) by 294 days.

(21) Appl. No.: 14/890,034

(22) PCT Filed: Jun. 3, 2014

(86) PCT No.: PCT/KR2014/004915
§ 371 (c)(1),
(2) Date: Nov. 9, 2015

(87) PCT Pub. No.: WO2015/016479
PCT Pub. Date: Feb. 5, 2015

(65) Prior Publication Data
US 2016/0141565 A1 May 19, 2016

(30) Foreign Application Priority Data
Jul. 30, 2013 (KR) .................. 10-2013-0090044

(51) Int. Cl.
*H01M 2/02* (2006.01)
*H01M 4/58* (2010.01)
*H01M 10/0525* (2010.01)
(Continued)

(52) U.S. Cl.
CPC ........... *H01M 2/024* (2013.01); *H01M 4/525* (2013.01); *H01M 4/582* (2013.01);
(Continued)

(58) Field of Classification Search
None
See application file for complete search history.

(56) References Cited

U.S. PATENT DOCUMENTS 7,704,637 B2 * 4/2010 Yan .................. H01M 2/1094
429/163
2001/0004504 A1 6/2001 Nakamizo et al.
(Continued)

FOREIGN PATENT DOCUMENTS

CN 102484249 A 5/2012
CN 102664255 A 9/2012
(Continued)

OTHER PUBLICATIONS

Search Report from Office Action from Chinese Application No. 201480026445.5, dated Dec. 5, 2016.
(Continued)

*Primary Examiner* — Sarah A. Slifka
(74) *Attorney, Agent, or Firm* — Lerner, David, Littenberg, Krumholz & Mentlik, LLP

(57) ABSTRACT

Disclosed is a secondary battery to which an electrolyte can be additionally supplied. More particularly, provided is a secondary battery including an electrode assembly that includes a positive electrode, a negative electrode, and a separator disposed between the positive electrode and the negative electrode, and a porous elastic body that can contain an electrolyte, which are installed in a battery case.

24 Claims, 1 Drawing Sheet

(51) Int. Cl.
  *H01M 4/525* (2010.01)
  *H01M 10/052* (2010.01)
  *H01M 6/38* (2006.01)
(52) U.S. Cl.
  CPC ....... *H01M 4/5825* (2013.01); *H01M 10/052* (2013.01); *H01M 10/0525* (2013.01); *H01M 6/38* (2013.01); *H01M 2220/20* (2013.01); *Y02E 60/122* (2013.01); *Y02T 10/7011* (2013.01)

(56) References Cited

U.S. PATENT DOCUMENTS

2009/0123833 A1   5/2009   Mao et al.
2011/0052981 A1   3/2011   Lopez et al.
2013/0183588 A1   7/2013   Oh et al.

FOREIGN PATENT DOCUMENTS

| JP | S58172874 A | 10/1983 |
| JP | 2001143671 A | 5/2001 |
| JP | 2009533833 A | 9/2009 |
| JP | 2011222388 A | 11/2011 |
| JP | 2013134878 A | 7/2013 |
| KR | 2009-0066031 A | 6/2009 |
| KR | 20130038655 A | 4/2013 |
| WO | 2007118358 A1 | 10/2007 |
| WO | 2012039564 A2 | 3/2012 |

OTHER PUBLICATIONS

International Search Report for Application No. PCT/KR2014/004915 dated Sep. 1, 2014.

* cited by examiner

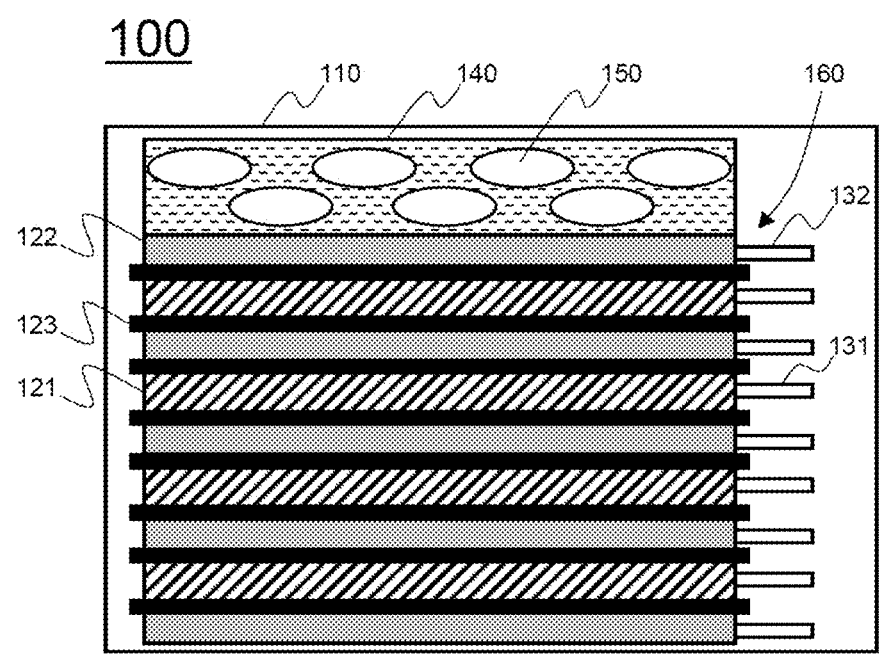

SECONDARY BATTERY TO WHICH ELECTROLYTE CAN BE ADDITIONALLY SUPPLIED

CROSS REFERENCE TO RELATED APPLICATIONS

The present application is a national phase entry under 35 U.S.C. § 371 of International Application No. PCT/KR2014/004915, filed Jun. 3, 2014, which claims priority from Korean Patent Application No. 10-2013-0090044, filed Jul. 30, 2013, the disclosures of which are incorporated herein by reference.

TECHNICAL FIELD

The present invention relates to a secondary battery to which an electrolyte can be additionally supplied.

BACKGROUND ART

As mobile device technology continues to develop and demand therefor continues to increase, demand for secondary batteries as energy sources is rapidly increasing. Among these secondary batteries, lithium secondary batteries which have high energy density and voltage and exhibit long lifespan and low self-discharge rate are commercially available and widely used.

In general, lithium secondary batteries use metal oxides such as LiCoO2 as positive electrode active materials, and carbon-based materials as negative electrode active materials. In addition, a polyolefin-based porous separator is disposed between a negative electrode and a positive electrode and impregnated with a non-aqueous electrolyte including a lithium salt such as LiPF6, thereby manufacturing a lithium secondary battery.

During charging, lithium ions of a positive electrode active material are released and inserted into a carbon layer of a negative electrode. During discharge, lithium ions of a carbon layer are released and inserted into a positive electrode active material. A non-aqueous electrolyte functions as a medium that migrates lithium ions between a negative electrode and a positive electrode.

However, the electrolyte is continuously consumed by side reaction in a negative electrode and oxidation in a positive electrode during operation of a secondary battery. Accordingly, when the amount of the electrolyte is excessively decreased, desired battery performance cannot be exhibited and lifespan of a secondary battery is rapidly reduced.

Further, when a large amount of electrolyte is added during secondary battery manufacture in order to resolve the problems, an interface between an electrode assembly breaks, and thus, lifespan characteristics are deteriorated.

Therefore, there is an urgent need for technology to resolve such problems.

DISCLOSURE

Technical Problem

Therefore, the present invention has been made to solve the above and other technical problems that have yet to be resolved.

As a result of a variety of extensive and intensive studies and experiments, the inventors of the present invention completed a secondary battery to which an electrolyte may be additionally supplied, as described below.

Technical Solution

In accordance with one aspect of the present invention, provided is a secondary battery, wherein an electrode assembly including a positive electrode, a negative electrode, and a separator disposed between the positive electrode and the negative electrode, and a porous elastic body that can contain an electrolyte, are installed in a battery case.

Pressure may be applied to the porous elastic body containing an electrolyte upon volume expansion of the electrode assembly to supply the electrolyte to the electrode assembly.

Pressure may be applied to the porous elastic body when a volume of the electrode assembly expands by 10% or more, to supply the electrolyte to the electrode assembly.

The sizes of pores of the porous elastic body may be 0.01 micrometers to 5000 micrometers.

The porosity of the porous elastic body may be 20% to 95%.

The porous elastic body may be foamed rubber or a foamed synthetic resin.

The foamed rubber may be made of natural rubber or synthetic rubber.

The synthetic rubber may be at least one selected from the group consisting of styrene-butadiene rubber, polychloroprene rubber, nitrile rubber, butyl rubber, butadiene rubber, isoprene rubber, ethylene propylene rubber, polysulfide rubber, silicone rubber, fluoro rubber, urethane rubber, and acrylic rubber.

The foamed synthetic resin may include at least one selected from the group consisting of polyolefin, polyester, polyamide, polyacetal, polycarbonate, polyimide, polyetherketone, polyethersulfone, polyphenyleneoxide, polyphenylenesulfide, polyethylene naphthalene, polytetrafluoroethylene, polyvinylidene fluoride, polyethylene terephthalate, polyvinyl chloride, polyacrylonitrile, nylon, polyparaphenylene benzoisoxazole, polyacrylate, and polyurethane.

The porous elastic body may be attached to the electrode assembly.

The porous elastic body may be attached to a location which does not interfere with positive electrode taps and negative electrode taps of the electrode assembly.

The porous elastic body may be attached to the electrode assembly in a layered direction having large volume expansion.

The porous elastic body may be attached to an upper portion and/or a lower portion of the electrode assembly with respect to a layered direction of the electrode assembly.

The porous elastic body may be inserted into the middle of the electrode assembly.

The porous elastic body may be attached to a battery case.

The porous elastic body may be attached to a bottom side of a receiving portion of a battery case in which the electrode assembly is accommodated and/or a cover side of the battery case opposite the bottom side.

The thickness of the porous elastic body may be thinner than the electrode assembly.

The size of the porous elastic body may be 80% to 120% with respect to an area of the electrode assembly.

The positive electrode may include a lithium transition metal oxide represented by Formula 1 or 2 below as a positive electrode active material.

$$Li_xM_yMn_{2-y}O_{4-z}A_z \qquad (1),$$

wherein M is at least one element selected from the group consisting of Al, Mg, Ni, Co, Fe, Cr, V, Ti, Cu, B, Ca, Zn, Zr, Nb, Mo, Sr, Sb, W, Ti and Bi;

A is at least one monovalent or divalent anion; and $0.9 \leq x \leq 1.2$, $0 < y < 2$, and $0 \leq z < 0.2$.

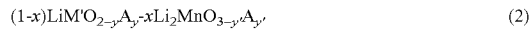
(2)

wherein M is $Mn_aM_b$;

M is at least one selected from the group consisting of Ni, Ti, Co, Al, Cu, Fe, Mg, B, Cr, Zr, Zn and Period II transition metals;

A is at least one selected from the group consisting of anions such as $PO_4$, $BO_3$, $CO_3$, F and $NO_3$; and $0 < x < 1$, $0 < y \leq 0.02$, $0 < y' \leq 0.02$, $0.5 \leq a \leq 1.0$, $0 \leq b \leq 0.5$, and $a+b=1$.

The negative electrode may include a carbon-based material and/or Si as a negative electrode active material.

The secondary battery may be a lithium ion battery, a lithium ion polymer battery, or a lithium polymer battery.

The present invention provides a battery module including the secondary battery as a unit cell, a battery pack including the battery module, and a device including the battery pack as a power source.

In this case, the device may be an electric vehicle, a hybrid electric vehicle, a plug-in hybrid electric vehicle, or a system for storing power.

BRIEF DESCRIPTION OF THE DRAWINGS

The above and other objects, features and other advantages of the present invention will be more clearly understood from the following detailed description taken in conjunction with the accompanying drawings, in which:

FIG. 1 illustrates a schematic view of a structure of a secondary battery according to one embodiment of the present invention.

MODE FOR INVENTION

Now, the present invention will be described in more detail with reference to the accompanying drawings. These examples are provided for illustrative purposes only and should not be construed as limiting the scope and spirit of the present invention.

As described above, a secondary battery according to the present invention includes an electrode assembly including a positive electrode, a negative electrode, and a separator disposed between the positive electrode and the negative electrode, and a porous elastic body that can contain an electrolyte, which are installed in a battery case.

In a specific embodiment, Pressure may be applied to the porous elastic body containing an electrolyte upon volume expansion of the electrode assembly to supply the electrolyte to the electrode assembly.

The inventors of the present invention confirmed that, since the electrolyte contained in the porous elastic body is supplied by volume expansion of an electrode assembly during operation of a battery without separate artificial manipulation, lifespan characteristics of a secondary battery may be more easily improved.

In a specific embodiment, when a Si-based negative electrode active material is used, volume expands by 260% or more, and thus, the volume of an electrode assembly expands and lifespan deterioration occurs due to exhaustion of an electrolyte. Accordingly, Pressure may be applied to the porous elastic body when the volume of the electrode assembly expands by 10% or more, to supply the electrolyte to the electrode assembly.

Meanwhile, the sizes of pores of the porous elastic body may be 0.01 micrometers to 5000 micrometers, and a porosity thereof may be 20% to 95%.

In a specific embodiment, so long as pressure is added to the porous elastic body containing an electrolyte upon volume expansion of the electrode assembly to supply the electrolyte to the electrode assembly, the porous elastic body is not specifically limited. In particular, the porous elastic body may be a foamed rubber or foamed synthetic resin. In this case, the foamed rubber may be made of natural rubber or synthetic rubber, but the present invention is not limited thereto.

In a specific embodiment, the synthetic rubber may be at least one selected from the group consisting of styrene-butadiene rubber, polychloroprene rubber, nitrile rubber, butyl rubber, butadiene rubber, isoprene rubber, ethylene propylene rubber, polysulfide rubber, silicone rubber, fluoro rubber, urethane rubber, and acrylic rubber, but the present invention is not limited thereto.

In addition, the foamed synthetic resin may include at least one material selected from the group consisting of polyolefin, polyester, polyamide, polyacetal, polycarbonate, polyimide, polyetherketone, polyethersulfone, polyphenyleneoxide, polyphenylene sulfide, polyethylene naphthalene, polytetrafluoroethylene, polyvinylidene fluoride, polyethylene terephthalate, polyvinyl chloride, polyacrylonitrile, nylon, polyparaphenylene benzoisoxazole, polyacrylate and polyurethane, but the present invention is not limited thereto.

In a specific embodiment, the porous elastic body may be attached to the electrode assembly. In this case, the porous elastic body may be attached to a location which does not interfere with positive electrode taps and negative electrode taps of the electrode assembly.

Accordingly, problems such as degradation according to power failure and resistance increase that may occur when the porous elastic body contacts a positive electrode tap or a negative electrode tap may be prevented.

In addition, the porous elastic body may be attached to the electrode assembly in a layered direction having large volume expansion. Accordingly, the porous elastic body may be attached to an upper portion and/or a lower portion of the electrode assembly with respect to a layered direction of the electrode assembly or inserted in a middle of the electrode assembly.

In another specific embodiment, the porous elastic body may be attached to a battery case.

In this case, the porous elastic body may be attached to a bottom side of a receiving portion of a battery case in which the electrode assembly is accommodated and/or a cover side of the battery case opposite the bottom side.

In a specific embodiment, the thickness of the porous elastic body is thinner than the electrode assembly, and the size of the porous elastic body is 80% to 120% with respect to an area of the electrode assembly.

The thicknesses mean a distance between an upper portion side and a lower portion side in each of the porous elastic body and the electrode assembly with respect to a layered direction of the electrode assembly. The size means a multification value of remaining two sides except for a side corresponding to the thickness.

In a specific embodiment, the positive electrode may include a lithium transition metal oxide represented by Formula 1 or 2 below as a positive electrode active material.

$$Li_xM_yMn_{2-y}O_{4-z}A_z \quad (1),$$

wherein M is at least one element selected from the group consisting of Al, Mg, Ni, Co, Fe, Cr, V, Ti, Cu, B, Ca, Zn, Zr, Nb, Mo, Sr, Sb, W, Ti and Bi;

A is at least one monovalent or divalent anion; and $0.9 \leq x \leq 1.2$, $0 < y < 2$, and $0 \leq z < 0.2$.

$$(1-x)LiM'O_{2-y}A_{y'}-xLi_2MnO_{3-y'}A_{y'} \quad (2)$$

wherein M is $Mn_aM_b$;

M is at least one selected from the group consisting of Ni, Ti, Co, Al, Cu, Fe, Mg, B, Cr, Zr, Zn and Period II transition metals;

A is at least one selected from the group consisting of anions such as $PO_4$, $BO_3$, $CO_3$, F and $NO_3$; and $0<x<1$, $0<y\leq0.02$, $0<y'\leq0.02$, $0.5\leq a\leq1.0$, $0\leq b\leq0.5$, and $a+b=1$.

In general, the positive electrode is prepared by drying after coating a mixture of a positive electrode active material, a conductive material and a binder, as an electrode mixture, on a positive electrode current collector. In this case, as desired, the mixture may further include a filler.

Examples of the positive electrode active material may include, other than the lithium transition metal represented by Formula 1 or 2, layered compounds such as lithium cobalt oxide ($LiCoO_2$) and lithium nickel oxide ($LiNiO_2$) or compounds substituted with one or more transition metals; lithium manganese oxides represented by $Li_{1+x}Mn_{2-x}O_4$ where $0\leq x\leq0.33$, such as $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-x}M_xO_2$ where M=Co, Mn, Al, Cu, Fe, Mg, B, or Ga, and $0.01\leq x\leq0.3$; lithium manganese composite oxides having the formula $LiMn_{2-x}M_xO_2$ where M=Co, Ni, Fe, Cr, Zn, or Ta, and $0.01\leq x\leq0.1$ or the formula $Li_2Mn_3MO_8$ where M=Fe, Co, Ni, Cu, or Zn; spinel-structure lithium manganese composite oxides represented by $LiNi_xMn_{2-x}O_4$; $LiMn_2O_4$ where some of the Li atoms are substituted with alkaline earth metal ions; disulfide compounds; $Fe_2(MoO_4)_3$; and the like, but embodiments of the present invention are not limited thereto.

The positive electrode current collector is generally fabricated to a thickness of 3 to 500 μm. The positive electrode current collector is not particularly limited so long as it does not cause chemical changes in the fabricated lithium secondary battery and has high conductivity. For example, the positive electrode current collector may be made of stainless steel, aluminum, nickel, titanium, sintered carbon, aluminum or stainless steel surface-treated with carbon, nickel, titanium, or silver, or the like. The positive electrode current collector may have fine irregularities at a surface thereof to increase adhesion between the positive electrode active material and the positive electrode current collector. In addition, the positive electrode current collector may be used in any of various forms including films, sheets, foils, nets, porous structures, foams, and non-woven fabrics.

The conductive material is generally added in an amount of 1 to 50 wt % based on the total weight of a mixture including a positive electrode active material. There is no particular limit as to the conductive material, so long as it does not cause chemical changes in the fabricated battery and has conductivity. For example, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide whiskers and potassium titanate whiskers; conductive metal oxides such as titanium oxide; conductive materials such as polyphenylene derivatives; and the like may be used.

Meanwhile, the graphite-based material having elasticity may be used as the conductive material and may be used with the other materials.

The binder is a component assisting in binding between an active material and the conductive material and in binding of the active material to a current collector. The binder is typically added in an amount of 1 to 50 wt % based on the total weight of the mixture including the positive electrode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit positive electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

Secondary batteries including the lithium transition metal oxide generally include a positive electrode, a negative electrode, a separator disposed between the positive electrode and the negative electrode, and a lithium salt-containing non-aqueous electrolyte. Other constituents of the lithium secondary batteries are described below.

The negative electrode may be prepared by coating, drying and pressing a negative electrode active material on a negative electrode current collector. As desired, the conductive material, the binder, the filler and the like described above may be selectively further included.

Examples of the negative electrode active material include carbon such as hard carbon and graphite-based carbon; metal composite oxides such as $Li_xFe_2O_3$ where $0\leq x\leq1$, $Li_xWO_2$ where $0\leq x\leq1$, $Sn_xMe_{1-x}Me'_yO_z$ where Me: Mn, Fe, Pb, or Ge; Me': Al, B, P, Si, Group I, II and III elements, or halogens; $0<x\leq1$; $1\leq y\leq3$; and $1\leq z\leq8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials; titanium oxides; lithium titanium oxides; and the like, particularly carbon-based materials and/or Si.

The negative electrode current collector is typically fabricated to a thickness of 3 to 500 μm. The negative electrode current collector is not particularly limited so long as it does not cause chemical changes in the fabricated battery and has conductivity. For example, the negative electrode current collector may be made of copper, stainless steel, aluminum, nickel, titanium, sintered carbon, copper or stainless steel surface-treated with carbon, nickel, titanium, or silver, and aluminum-cadmium alloys. Similar to the positive electrode current collector, the negative electrode current collector may also have fine irregularities at a surface thereof to enhance adhesion between the negative electrode current collector and the negative electrode active material and may be used in various forms including films, sheets, foils, nets, porous structures, foams, and non-woven fabrics.

The separator is disposed between the positive electrode and the negative electrode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of a non-aqueous electrolyte and lithium. As the non-aqueous electrolyte, a non-aqueous organic solvent, an organic solid electrolyte, an inorganic solid electrolyte or the like may be used, but the present invention is not limited thereto.

Examples of the non-aqueous organic solvent include non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the non-aqueous electrolyte and examples thereof include, but are not limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the lithium salt-containing non-aqueous electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, and fluoro-ethylene carbonate (FEC), propene sultone (PRS) and the like may be further included.

In one specific embodiment, a lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent including EC or PC, which is a high dielectric solvent and a cyclic carbonate, and DEC, DMC, or EMC, which is a low viscosity solvent and a linear carbonate.

Meanwhile, the secondary battery may be a lithium ion battery, a lithium ion polymer battery, or a lithium polymer battery, but the present invention is not limited thereto.

The present invention provides a battery module including the secondary battery as a unit cell, a battery pack including the battery module, and a device including the battery pack as a power source.

In this regard, particular examples of the devices include, but are not limited thereto, electric vehicles, hybrid electric vehicles, plug-in hybrid electric vehicles, or systems for storing power.

Now, the present invention will be described in more detail with reference to the accompanying drawings. These examples are provided for illustrative purposes only and should not be construed as limiting the scope and spirit of the present invention.

FIG. 1 illustrates a schematic view of a secondary battery according to one embodiment of the present invention.

Referring to FIG. 1, in a secondary battery 100 according to the present invention, an electrode assembly 160 including a positive electrode 121, a negative electrode 122, and a separator 123 disposed between the positive electrode 121 and the negative electrode 122, and a porous elastic body 140 that may contain an electrolyte are installed in a battery case 110.

The porous elastic body 140 includes pores 150 having a size of 0.01 micrometers to 5000 micrometers. The pores 150 may contain an electrolyte.

The volume of an electrode assembly 160 may be expanded due to due to expansion of a negative electrode 122, gas generation, etc. during operation of a secondary battery. Accordingly, when the volume of the electrode assembly 160 expands, an electrolyte contained in the porous elastic body 140 is supplied to the electrode assembly 160 by adding pressure to the porous elastic body 140.

The porous elastic body 140 is attached to the electrode assembly 160. Here, the porous elastic body 140 is attached to an upper portion of the electrode assembly 160 in a layered direction of the electrode assembly 160 at a state in which positive electrode taps 131 and negative electrode taps 132 are not interfered, but the present invention is not limited thereto. In addition, the porous elastic body 140 may be attached to a lower portion of the electrode assembly 160 or may be inserted into the middle of the electrode assembly 160.

In addition, the porous elastic body 140 may be attached to the battery case 110. In this case, the porous elastic body 140 may be attached to a bottom side of a receiving portion of a battery case 110 in which the electrode assembly 160 is accommodated and/or a cover side of the battery case opposite the bottom side Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, since a porous elastic body that can contain an electrolyte is installed in a secondary battery according to the present invention, a battery case, the porous elastic body may additionally supply the electrolyte to an electrode assembly, and thus, lifespan characteristics of a secondary battery may be more easily improved.

The invention claimed is:

1. A secondary battery comprising a battery case, in which an electrode assembly and a porous elastic body are installed, wherein the electrode assembly comprises a positive electrode, a negative electrode, and a separator disposed between the positive electrode and the negative electrode, and the porous elastic body contains an electrolyte, and wherein the porous elastic body is inserted in a middle of the electrode assembly.

2. The secondary battery according to claim 1, wherein pressure is added to the porous elastic body upon volume expansion of the electrode assembly to supply the electrolyte to the electrode assembly.

3. The secondary battery according to claim 2, wherein the pressure is added to the porous elastic body when a volume of the electrode assembly expands by 10% or more, to supply the electrolyte to the electrode assembly.

4. The secondary battery according to claim 1, wherein sizes of pores of the porous elastic body are 0.01 micrometers to 5000 micrometers.

5. The secondary battery according to claim 1, wherein a porosity of the porous elastic body is 20% to 95%.

6. The secondary battery according to claim 1, wherein the porous elastic body is foamed rubber or a foamed synthetic resin.

7. The secondary battery according to claim 6, wherein the foamed rubber is made of natural rubber or synthetic rubber.

8. The secondary battery according to claim 7, wherein the synthetic rubber is at least one selected from the group consisting of styrene-butadiene rubber, polychloroprene rubber, nitrile rubber, butyl rubber, butadiene rubber, isoprene rubber, ethylene propylene rubber, polysulfide rubber, silicone rubber, fluoro rubber, urethane rubber and acrylic rubber.

9. The secondary battery according to claim 6, wherein the foamed synthetic resin includes at least one selected from the group consisting of polyolefin, polyester, polyamide, polyacetal, polycarbonate, polyimide, polyetherketone, polyethersulfone, polyphenyleneoxide, polyphenylenesulfide, polyethylene naphthalene, polytetrafluoroethylene, polyvinylidene fluoride, polyethylene terephthalate, polyvinyl chloride, polyacrylonitrile, nylon, polyparaphenylene benzoisoxazole, polyacrylate and polyurethane.

10. The secondary battery according to claim 1, wherein the porous elastic body is attached to the electrode assembly.

11. The secondary battery according to claim 10, wherein the porous elastic body is attached at a location which does not interfere with positive electrode taps and negative electrode taps of the electrode assembly.

12. The secondary battery according to claim 10, wherein the porous elastic body is attached to the electrode assembly in a layered direction having volume expansion.

13. The secondary battery according to claim 12, wherein the porous elastic body is attached to an upper portion and/or a lower portion of the electrode assembly with respect to a layered direction of the electrode assembly.

14. The secondary battery according to claim 1, wherein the porous elastic body is attached to a battery case.

15. The secondary battery according to claim 14, wherein the porous elastic body is attached to a bottom side of a receiving portion of a battery case in which the electrode assembly is accommodated and/or a cover side of the battery case opposite the bottom side.

16. The secondary battery according to claim 1, wherein a thickness of the porous elastic body is thinner than the electrode assembly.

17. The secondary battery according to claim 1, wherein a size of the porous elastic body is 80% to 120% with respect to an area of the electrode assembly.

18. The secondary battery according to claim 1, wherein the positive electrode comprises a lithium transition metal oxide represented by Formula 1 or 2 below as a positive electrode active material:

$$Li_xM_yMn_{2-y}O_{4-z}A_z \qquad (1),$$

wherein M is at least one element selected from the group consisting of Al, Mg, Ni, Co, Fe, Cr, V, Ti, Cu, B, Ca, Zn, Zr, Nb, Mo, Sr, Sb, W, Ti and Bi;

A is at least one monovalent or divalent anion; and $0.9 \leq x \leq 1.2$, $0 < y < 2$, $0 \leq z < 0.2$, $$(1-x)LiM'O_{2-y}A_{y'-x}Li_2MnO_{3-y'}A_{y'} \qquad (2),$$

wherein M is $Mn_aM_b$;

M is at least one selected from the group consisting of Ni, Ti, Co, Al, Cu, Fe, Mg, B, Cr, Zr, Zn and Period II transition metals;

A is at least one selected from the group consisting of anions such as $PO_4$, $BO_3$, $CO_3$, F and $NO_3$; and $0 < x < 1$, $0 < y \leq 0.02$, $0 < y' \leq 0.02$, $0.5 \leq a \leq 1.0$, $0 \leq b \leq 0.5$, and $a+b=1$.

19. The secondary battery according to claim 1, wherein the negative electrode comprises carbon-based material and/or Si as a negative electrode active material.

20. The secondary battery according to claim 1, wherein the secondary battery is a lithium ion battery, a lithium ion polymer battery, or a lithium polymer battery.

21. A battery module comprising the secondary battery according to claim 1 as a unit cell.

22. A battery pack comprising the battery module according to claim 21.

23. A device comprising the battery pack according to claim 22 as a power source.

24. The device according to claim 23, wherein the device is an electric vehicle, a hybrid electric vehicle, a plug-in hybrid electric vehicle or a system for storing power.

* * * * *